United States Patent [19]

Gandre

[11] Patent Number: 5,497,292
[45] Date of Patent: Mar. 5, 1996

[54] CONFIGURABLE COMPUTER CHASSIS PORT AND METHOD OF MANUFACTURE THEREFOR

[75] Inventor: Jerry D. Gandre, Austin, Tex.

[73] Assignee: Dell USA, L.P., Austin, Tex.

[21] Appl. No.: 323,298

[22] Filed: Oct. 14, 1994

[51] Int. Cl.[6] .................................................. H05K 9/00
[52] U.S. Cl. ...................... 361/818; 361/752; 361/796; 361/816; 174/17 R; 174/35 R; 439/108
[58] Field of Search ................................. 361/752, 756, 361/753, 796, 797, 800, 802, 816, 818; 174/35 R, 35 TS, 17 R; 220/402; 439/108, 109; 455/300, 90, 347

[56] References Cited

U.S. PATENT DOCUMENTS

| | | | |
|---|---|---|---|
| 4,356,531 | 10/1982 | Marino et al. | 361/384 |
| 4,901,205 | 2/1990 | Landis et al. | 361/424 |
| 5,172,305 | 12/1992 | DeWilde | 361/415 |
| 5,224,019 | 6/1993 | Wong et al. | 361/393 |
| 5,406,453 | 4/1995 | Cusato et al. | 361/733 |

Primary Examiner—Michael W. Phillips
Assistant Examiner—Y. Whang
Attorney, Agent, or Firm—David Hitt; James Huffman

[57] ABSTRACT

A computer chassis having a port adapted to be configured to receive electrical connectors of differing dimensions therethrough and a method of manufacturing such configurable ports. The computer chassis comprises: (1) a chassis wall having a substantially planar portion, the substantially planar portion having a first port therethrough of first predetermined dimensions, the first predetermined dimensions corresponding to external dimensions of a first electrical connector and (2) a partially-sheared punchout section defined in the substantially planar portion of the chassis wall, the punchout section removably coupled to the chassis wall and having an edge contiguous with the first port, the edge forming a portion of a perimeter of the first port and substantially coplanar with the substantially planar portion of the chassis wall, the punchout section selectably removable to create an aperture through the chassis wall, the first port and the aperture cooperating to form a second port through the chassis wall of second predetermined dimensions, the second predetermined dimensions corresponding to external dimensions of a second electrical connector.

30 Claims, 3 Drawing Sheets

CONFIGURABLE COMPUTER CHASSIS PORT AND METHOD OF MANUFACTURE THEREFOR

TECHNICAL FIELD OF THE INVENTION

The present invention is directed, in general, to computer systems and, more specifically, to a port provided in a wall of a computer chassis, the port including a punchout section thereby being configurable to accept connectors of different dimension therethrough.

BACKGROUND OF THE INVENTION

A computer chassis has many functions. First, it serves as a shelter to contain electronic and mechanical components of a computer, protecting them from harmful contact with external mechanical or electrical forces. Second, it serves as a mounting structure to which the components are secured in a prescribed relative position to allow convenient interconnecting of the components.

Finally, the chassis serves as a barrier for electromagnetic interference ("EMI") caused by electromagnetic fields generated within or without the chassis. As computers have grown more powerful, the electronic components thereof have become faster, increasing the potential for generation of interfering (and often illegal) radio frequency interference ("RFI"). Further, the electronic components have themselves become more sensitive to RFI generated externally. Therefore, good chassis design dictates that there not be open ports in the chassis that can emanate or admit EMI. Further, the chassis should provide a grounding path for the energy contained in the EMI.

With these functions in mind, the manufacturing process for electronics chasses for computers, and for personal computers ("PCs") in particular, is at least a three-step process depending, in large part, on the final desired shape of the chassis, the manner in which the chassis is to be secured to its environment and the manner in which electronic components are to be secured within the chassis.

Manufacture of a typical chassis (generally a box-like structure) begins by stamping parts of the chassis out of sheet metal with a die press. The stamping step yields one or more flat sheets of metal having a desired geometry. The flat sheets are then bent or folded to form portions of the finished chassis. In the bending step, various edges of the flat sheet are brought into proximity with one another to form edges and corners of the chassis portions. The edges or corners may be spot welded, soldered or brazed together to create a permanent bond. Finally, screws or other removable fasteners may be used removably to join the chassis portions together to form a rigid, mechanically sturdy chassis, to form a barrier as against EMI emanating from the components in the chassis, to shield the components from stray EMI from without the chassis and to form good electrical conductivity in the chassis for grounding purposes, as described previously.

During the stamping step, one or more ports may be formed in the chassis portions by completely shearing portions of the metal away with the die press. The ports are provided for the purpose of accepting electrical connectors therethrough. The electrical connectors allow interconnection of the components within the chassis to equipment outside the chassis. However, given the open architecture of IBM-compatible PCs and the myriad of possible hardware and connector configurations, it is difficult task to provide a chassis capable of accommodating all of the possible configurations.

Again, it is unacceptable to provide a universal chassis having ports for every conceivable hardware option, as unoccupied open ports on the chassis rear wall compromise EMI shielding (and ultimately run afoul of mandatory Federal Communications Commission RFI emission certification).

Therefore, to accommodate some degree of universality, prior art chassis portions often include partially-sheared portions (so-called "punchouts") that cover ports. Because they are only partially-sheared, punchouts are electrically coupled to the remainder of the chassis rear wall substantially entirely around their perimeter and thus provide an EMI shield. If it is desired to mount a connector through a particular port, the punchout is removed with a prying or punching tool, thereby exposing a port. If it is desired to leave the port empty, the punchout remains in place, thereby retaining EMI shielding. In this way, a single, universal chassis may be configured to contain a variety of differing hardware and connector options.

Unfortunately, with electronic components and their chasses shrinking in size and an ever-growing number of options in computer hardware configuration, limitations in rear chassis wall area have become acute. It is becoming increasingly difficult to provide a sufficient number of punchout-covered ports.

The limitation in rear wall area is particularly frustrating when hardware configurations are mutually exclusive. For instance, in PCs, there are two different small computer systems interface ("SCSI") standards: SCSI III (using a wider, 68 pin electrical connector and thus called "SCSI Wide") and SCSI II, using a narrower, 50 pin electrical connector and thus called "SCSI Narrow"). Often, a single PC does not need to contain connectors for both SCSI III and SCSI II. However, because the connectors for SCSI III and SCSI II are of different predetermined dimensions, two separate ports (covered by punchouts) must be provided on the rear wall of every PC chassis, only one of which is ultimately exposed depending upon the SCSI standard adopted in each PC. Thus, more rear wall area is required than should be.

Accordingly, what is needed in the art is a way of making each chassis port selectably configurable in size, such that a single configurable port can adapt to different alternative electrical connectors, thereby conserving rear wall area.

SUMMARY OF THE INVENTION

To address the above-discussed deficiencies of the prior art, it is a primary object of the present invention to provide a configurable port for a computer chassis wall, the port manually-modifiable to allow electrical connectors of differing dimension to be alternatively mounted through the port, thereby saving valuable area on the rear chassis wall.

In the attainment of the above primary object, one aspect of the present invention provides a computer chassis having a port adapted to be configured to receive electrical connectors of differing dimensions therethrough. The computer chassis comprises: (1) a chassis wall having a substantially planar portion, the substantially planar portion having a first port therethrough of first predetermined dimensions, the first predetermined dimensions corresponding to external dimensions of a first electrical connector and (2) a partially-sheared punchout section defined in the substantially planar portion of the chassis wall, the punchout section removably coupled to the chassis wall and having an edge contiguous with the first port, the edge forming a portion of a perimeter of the first port and substantially coplanar with the substantially planar portion of the chassis wall, the punchout section selectably removable to create an aperture through the chassis wall, the first port and the aperture cooperating to form a second port through the chassis wall of second predetermined dimensions, the second predetermined dimensions corresponding to external dimensions of a second electrical connector.

The advantage of the above-described configuration is that, with the punchout section removed, the second port formed thereby has a substantially planar perimeter allowing the second electrical connector to be mounted mechanically soundly through the second port. Alternatively, with the punchout section intact, the first port also has a coplanar perimeter (by virtue of the coplanar edge), allowing the first electrical connector to be mounted mechanically soundly through the first port. This avoids the prior art problem of substantial gaps existing between the connectors and the ports. The present invention further leaves the aperture covered when the smaller, first electrical connector is used.

It is a further object of the present invention to be compatible with chassis walls that serve as electromagnetic shields. Thus, in a preferred embodiment of the present invention, the chassis wall is composed of an EMI-shielding material, the punchout section forming a portion of an electromagnetic shield when the first electrical connector is selectably mounted through the first port to thereby isolate electromagnetic fields within the chassis from electromagnetic fields without the chassis.

In a preferred embodiment of the present invention, the punchout section is coupled to the chassis wall by a tie-in section, the tie-in section manually shearable to create the aperture and the second port. The tie-in section constitutes a shearable bridge of material coupling the punchout section to the chassis wall. In an embodiment to be illustrated, the tie-in section is proximate the edge of the punchout section. To remove the punchout section, the punchout section is rotated relative to the chassis wall, roughly about the edge as an axis. As the punchout section is rotated, the tie-in section shears, releasing the punchout section for disposal. In practice, it has been found that the tie-in section shears cleanly, such that no substantial artifacts remain to interfere with mounting of the second electrical connector.

In a preferred embodiment of the present invention, a plane of the punchout section is noncoplanar with the substantially planar portion of the chassis wall, the punchout section thereby tapered toward a plane of the substantially planar portion substantially to intersect the plane at the edge. Thus, the punchout section tapers toward the plane of the chassis wall as it approaches the edge. This allows most of the punchout section to be partially sheared during the stamping step.

In a preferred embodiment of the present invention, the first electrical connector has a substantially planar first mounting flange about an exterior perimeter thereof, a perimeter of the first port, including the edge of the punchout section, being substantially planar to mate with the first mounting flange, the perimeter of the first port and the first mounting flange cooperating to form an electromagnetic shield when the first electrical connector is selectably mounted through the first port to thereby isolate electromagnetic fields within the chassis from electromagnetic fields without the chassis. Therefore, the first mounting flange overlaps the perimeter of the first port to form an EMI barrier. Thus, it is important to the present invention that the edge be coplanar with the remainder of the chassis wall. This allows the first mounting flange to seat correctly and entirely about its perimeter to form the EMI barrier and to be reliably mounted in place.

In a preferred embodiment of the present invention, the punchout section is a partially-sheared section of the substantially planar portion of the chassis wall. As previously described, the punchout section is preferably formed during stamping. However, those of skill in the art can recognize that the punchout section can be spot welded, brazed or soldered in place to cover the aperture or can be a part of a removable cap inserted into the aperture.

In a preferred embodiment of the present invention, the first electrical connector consists of fewer electrical conductors than the second electrical connector. In a more preferred embodiment, the first electrical connector is selected from the group consisting of: (1) a SCSI II connector and (2) a DB-9 connector. These are widely recognized electrical connectors for PCs. The DB-9 is commonly used for serial and video ports. In the more preferred embodiment, the second electrical connector is selected from the group consisting of: (1) a SCSI III connector and (2) a DB-25 connector. Again, these are widely-recognized connectors for PCs. The DB-25 is commonly employed for serial or parallel ports.

Although those of skill in the art will recognize that the present invention is useful in conjunction with any chassis containing electrical equipment, in a preferred embodiment of the present invention, the chassis contains electrical components of a PC.

In a preferred embodiment of the present invention, perimeters of the first and second ports contain portions adapted to receive threaded mounting rods therethrough. The first and second electrical connectors preferably mount to the chassis wall with a duality of threaded rods adapted to receive mounting nuts or adapted to fit within threaded recesses of a body of the selected electrical connector.

In the attainment of the above-described primary object, another aspect of the present invention provides a method of manufacturing a configurable computer chassis port, comprising the steps of: (1) forming a first port through a substantially planar portion of a chassis wall, the first port having first predetermined dimensions, the first predetermined dimensions corresponding to external dimensions of a first electrical connector and (2) defining a partially-sheared punchout section in the substantially planar portion of the chassis wall, the punchout section removably coupled to the chassis wall and having an edge contiguous with the first port, the edge forming a portion of a perimeter of the first port and substantially coplanar with the substantially planar portion of the chassis wall, the punchout section selectably removable to create an aperture through the chassis wall, the first port and the aperture cooperating to form a second port through the chassis wall of second predetermined dimensions, the second predetermined dimensions corresponding to external dimensions of a second electrical connector, the punchout section thereby yielding a port selectably configurable to accept electrical connectors of different dimension therethrough. In a preferred embodiment of the present invention, the steps of forming and defining are performed in a single stamping operation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
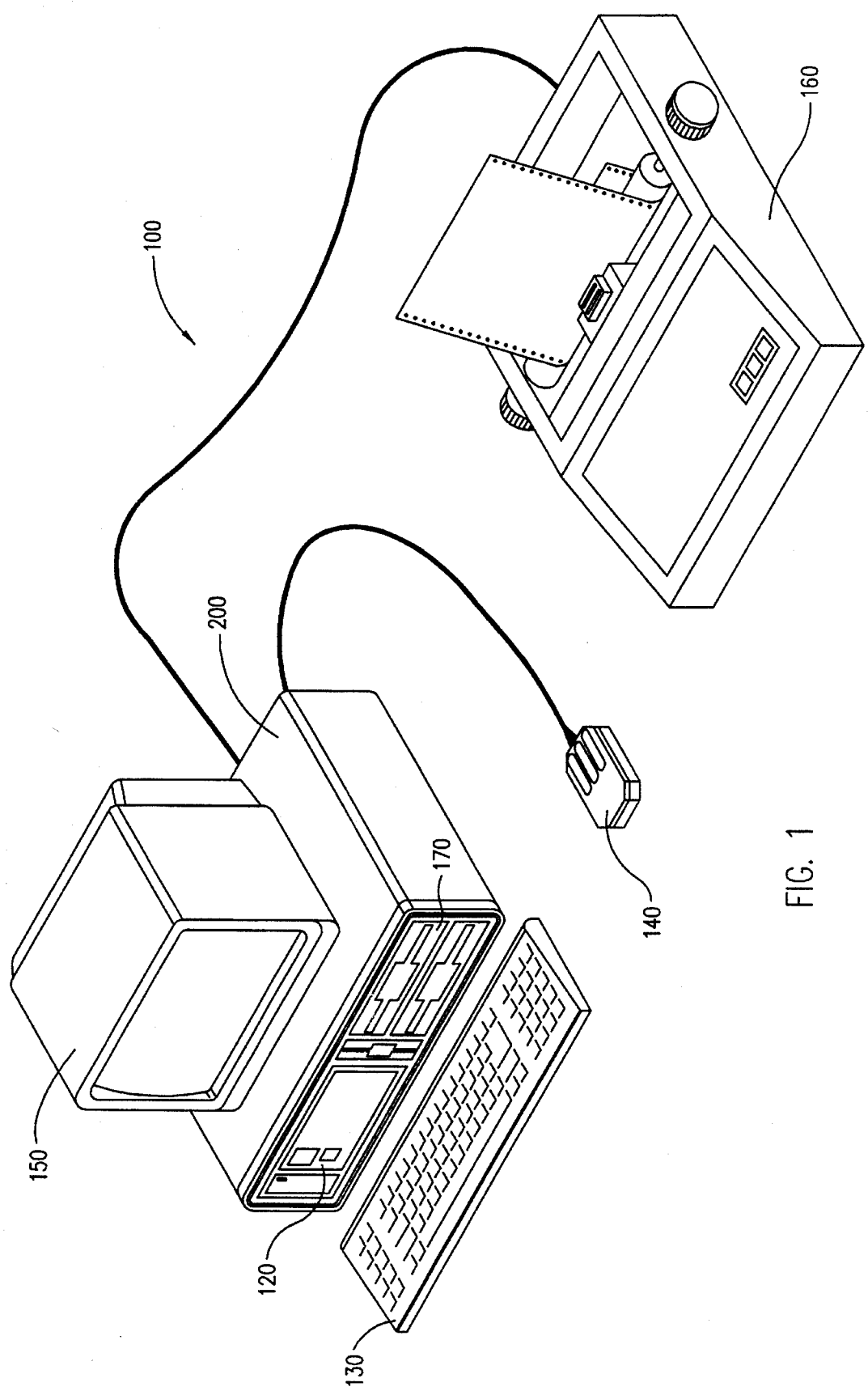
FIG. 1 illustrates an isometric view of a PC that serves as an environment within which the present invention can operate.

Referring initially to FIG. 1, illustrated is a PC 100 that provides an environment within which the present invention can operate. The PC 100 comprises a main chassis 200 containing computer system components to be illustrated and discussed in more detail with regard to FIG. 2. The main chassis 200 features, among other things, a reset button 120, a single pole momentary switch used to signal a CPU and other components (e.g. memory and input/output ("I/O") controllers not shown in FIG. 1) within the PC 100 to reboot, thereby providing a means of rebooting the PC 100. Coupled through individual connectors on the main chassis 200 are a keyboard 130, a mouse 140 and a video monitor 150 (constituting external data input and output devices).

A printer 160 is also shown coupled to a parallel port on a rear surface of the main chassis 200. The parallel port allows the PC 100 to send character or graphical data to the printer 160 for printing thereby. The peripheral devices 130, 140, 150, 160 allow the PC 100 to interact with a user. FIG. 1 also shows a disk drive 170, allowing permanent storage of computer system data on magnetic media.

Figure 2:
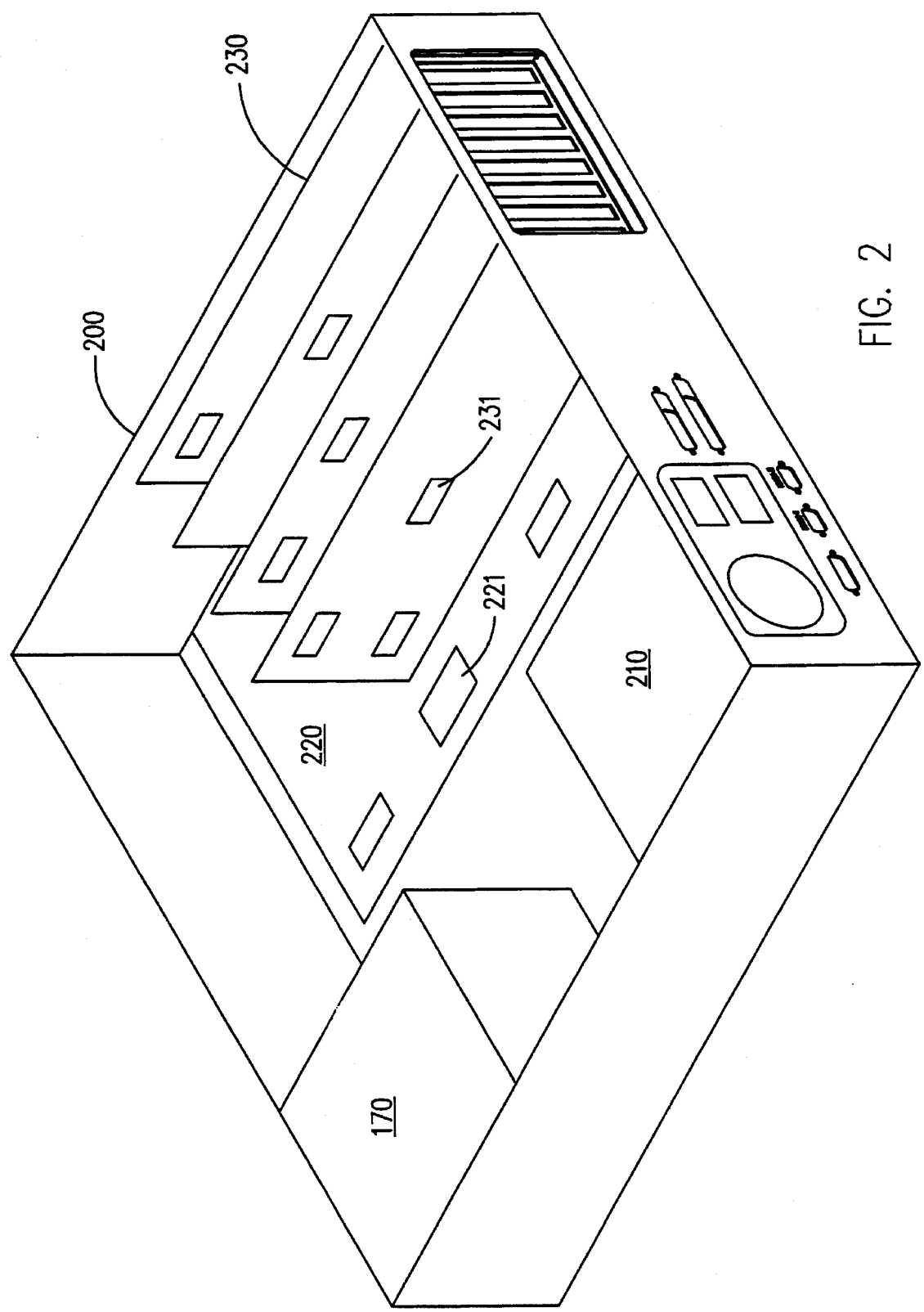
FIG. 2 illustrates a rearside isometric view of an exposed main chassis of the PC of FIG. 1.

Turning now to FIG. 2, illustrated is a rearside isometric view of an exposed main chassis of the PC of FIG. 1. The main chassis 200 is shown exposed to illustrate the relationship of the several mechanical and electrical components present in a typical main chassis 200. A motherboard 220 typically lies in a horizontal orientation proximate a lower surface of the main chassis 200. The motherboard 220 typically contains a microprocessor central processing unit ("CPU") 221 and other computer circuitry central to electrical operation of the computer system. A plurality of expansion cards 230 are removably inserted into expansion slots (not shown) of the motherboard 220, allowing the computer system to accommodate functional expansion to fit a user's particular needs. The expansion cards 230 typically contain ancillary computer circuitry 231 allowing the computer to, for instance, drive a video display, access disk and tape-based memory, access a network or communicate via a modem.

As is commonly understood, the CPU and other circuitry 221, 231, and attendant hardware, such as disk and tape drives, need reliable electrical power to function properly. Accordingly, it has been conventional for many years to provide a power supply 210 containing components employed to convert household power to a current and voltage level suitable for powering the CPU and other circuitry 221, 231 and attendant hardware.

Figure 3:
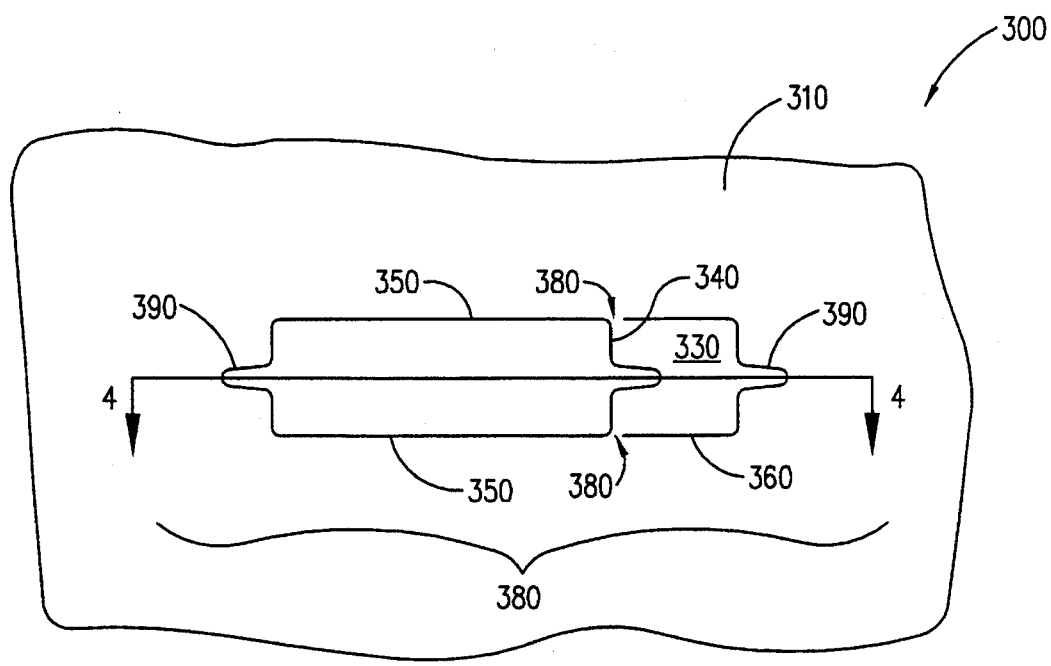
FIG. 3 illustrates a rearside partial elevational view of the main chassis of FIG. 2.

Turning now to FIG. 3, illustrate is a rearside partial elevational view of the main chassis 200 of FIG. 2. Again, the present invention provides a computer chassis having a port adapted to be configured to receive electrical connectors of differing dimensions therethrough. The main chassis 200 comprises a rear chassis wall 300 having a substantially planar portion 310. The substantially planar portion 310 has a first port 320 therethrough of first predetermined dimensions. The first predetermined dimensions correspond to external dimensions of a first electrical connector (illustrated in FIG. 4).

The substantially planar portion 310 further comprises a partially-sheared punchout section 330 defined in the substantially planar portion 310 of the rear chassis wall 300. The punchout section 330 is removably coupled to the rear chassis wall 300 and has an edge 340 contiguous with the first port 320. The edge 340 forms a portion of a perimeter 350 of the first port 320. The edge 340 is further substantially coplanar with the substantially planar portion 310 of the rear chassis wall 300, as shown.

The punchout section 330 is selectably removable to create an aperture 360 through the rear chassis wall 300. When the punchout section 330 is removed, the first port 320 and the aperture 360 cooperate to form a second port 370 (the length of which is indicated by a bracket) through the rear chassis wall 300 of second predetermined dimensions. The second predetermined dimensions correspond to external dimensions of a second electrical connector (not shown).

Again, the advantage of the above-described configuration is that, with the punchout section 330 removed, the second port 370 formed thereby has a substantially planar perimeter allowing the second electrical connector to be mounted mechanically soundly through the second port 370. Alternatively, with the punchout section 330 intact and in place, the first port 320 also has a coplanar perimeter 350 (by virtue of the coplanar edge 340). The coplanar perimeter allows the first electrical connector (shown in FIG. 4) to be mounted mechanically soundly through the first port 320. This avoids the prior art problem of substantial gaps existing between the connectors and the ports 320, 370. The present invention further leaves the aperture 360 covered when the smaller, first electrical connector is used.

In the illustrated embodiment, the rear chassis wall 300 is composed of a EMI-shielding material. In fact, the main chassis 200 of FIG. 2, as a whole, is designed to provide EMI shielding. The punchout section 330 forms a portion of an electromagnetic shield when the first electrical connector is selectably mounted through the first port 320 to isolate electromagnetic fields within the main chassis 200 from electromagnetic fields without the main chassis 200.

In the illustrated embodiment, the punchout section 330 is coupled to the substantially planar portion 310 of the rear chassis wall 300 by at least one tie-in section 380. The tie-in section 380 is manually shearable to create the aperture 360 and, thus, the second port 370. The tie-in section 380 constitutes a shearable bridge of material coupling the punchout section 330 to the rear chassis wall 300. In the preferred, illustrated embodiment, the tie-in section 380 comprises two tie-ins proximate the edge 340 of the punchout section 330. To remove the punchout section 330, the punchout section 330 is rotated relative to the rear chassis wall 300, roughly about the edge 340 as an axis. As the punchout section 330 is rotated from the plane of the substantially planar section 310, the tie-in section 380 shears, releasing the punchout section 330 for disposal. As previously mentioned, it has been found in practice that the tie-in section 380 shears cleanly, such that no substantial artifacts remain to interfere with mounting of the second electrical connector.

In the illustrated embodiment, perimeters of the first and second ports contain portions 390 adapted to receive threaded mounting rods (not shown in FIG. 3, but shown in FIG. 4 as rods 450) therethrough. A selected one of the first and second electrical connectors preferably mounts to the rear chassis wall 300 with a duality of threaded rods (again, the rods 450 of FIG. 4) adapted to receive mounting nuts or adapted to fit within threaded recesses of a body of the selected electrical connector.

Figure 4:
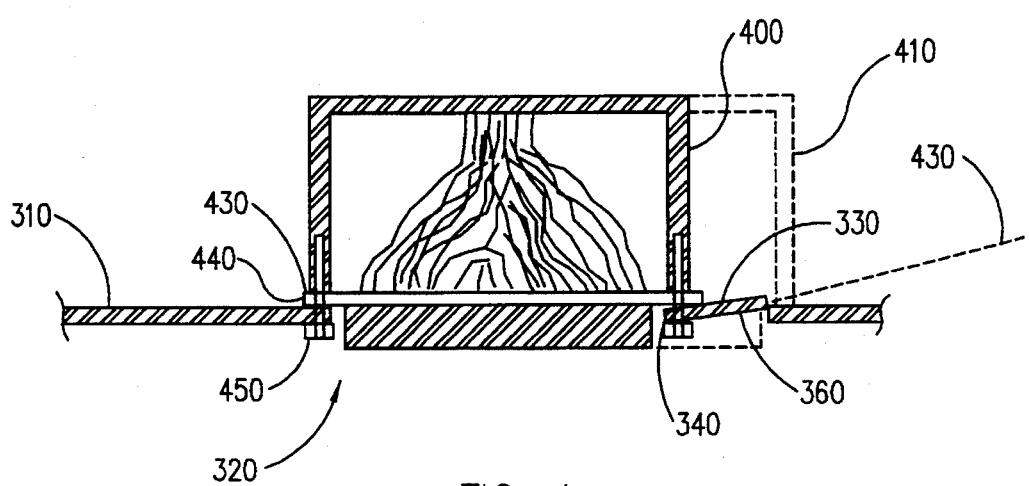
FIG. 4 illustrates a sectional view of the substantially planar portion and chassis port of FIG. 3 taken along lines 4—4 with an electrical connector mounted through the chassis port.

Turning now to FIG. 4, illustrated is a sectional view of the substantially planar portion 310 and first port 320 of FIG. 3 taken along lines 4—4 with a first electrical connector 400 mounted through the first port 320.

In the illustrated embodiment, a plane 430 of the punchout section 330 is noncoplanar with the substantially planar portion 310 of the rear chassis wall 300. The punchout section 330 is therefore tapered toward a plane of the substantially planar portion 310 substantially to intersect the plane at the edge 340. Thus, the punchout section 330 tapers toward the plane of the rear chassis wall 300 as it approaches the edge 340. This allows most of the punchout section 330 to be partially sheared during the stamping step.

In the illustrated embodiment, the punchout section 330 is a partially-sheared section of the substantially planar portion 310 of the rear chassis wall 300. As previously described, the punchout section 330 is preferably formed during stamping, preferably by providing a ramp-like protrusion and corresponding recess in the dies of the die press. However, those of skill in the art can recognize that the punchout section can be spot welded, brazed or soldered in place to cover the aperture 360 or can be a part of a removable cap inserted into the aperture 360.

The first electrical connector 400 is narrower than and consists of fewer electrical conductors than the second electrical connector 410 (shown in broken line). In a more preferred embodiment, the first electrical connector 400 is selected from the group consisting of: (1) a SCSI II connector and (2) a DB-9 connector. These are widely recognized electrical connectors for PCs. The DB-9 is commonly used for serial and video ports. The SCSI II connector may be, for example, a 50 position connector that is a part of the AMPILITE® connector system commercially available from Amp Incorporated of Harrisburg, Pa.

In the more preferred embodiment, the second electrical connector 410 is selected from the group consisting of: (1) a SCSI III connector and (2) a DB-25 connector. Again, these are widely-recognized connectors for PCs. The DB-25 is commonly employed for serial or parallel ports. The SCSI III connector may be a 68 position connector also commercially available from Amp Incorporated.

In the illustrated embodiment, the first electrical connector 400 has a substantially planar first mounting flange 430 about an exterior perimeter 440 thereof. The perimeter of the first port 320, including the edge 340 of the punchout section 330, is substantially planar to mate with the first mounting flange 430. The perimeter of the first port 320 and the first mounting flange 430 cooperate to form an electromagnetic shield when the first electrical connector 400 is selectably mounted through the first port 320 to thereby isolate electromagnetic fields within the main chassis 200 from electromagnetic fields without the main chassis 200. Therefore, the first mounting flange 430 overlaps and grounds to the perimeter of the first port 320 to form an EMI barrier. Thus, it is important to the present invention that the edge 340 be coplanar with the remainder of the rear chassis wall 300. This allows the first mounting flange 430 to seat correctly and entirely about its perimeter to form the EMI barrier and to be reliably mounted in place.

Although those of skill in the art will recognize that the present invention is useful in conjunction with any chassis containing electrical equipment, in the illustrated embodiment, the chassis contains electrical components of a PC.

As previously stated, another aspect of the present invention provides a method of manufacturing a configurable computer chassis port. The method comprises a step of forming a first port through a substantially planar portion of a chassis wall, the first port having first predetermined dimensions. Again, the first predetermined dimensions correspond to external dimensions of a first electrical connector. Next, the method comprises a step of defining a partially-sheared punchout section in the substantially planar portion of the chassis wall. The punchout section is removably coupled to the chassis wall and has an edge contiguous with the first port. The edge forms a portion of a perimeter of the first port and is substantially coplanar with the substantially planar portion of the chassis wall. The punchout section is selectably removable to create an aperture through the chassis wall. When removed, the first port and the aperture cooperate to form a second port through the chassis wall of second predetermined dimensions. The second predetermined dimensions correspond to external dimensions of a second electrical connector. In the illustrated embodiment, the steps of forming and defining are performed in a single stamping operation.

From the above description, it is apparent that the present invention provides a computer chassis having a port adapted to be configured to receive electrical connectors of differing dimensions therethrough and a method of manufacturing such configurable ports. The computer chassis comprises: (1) a chassis wall having a substantially planar portion, the substantially planar portion having a first port therethrough of first predetermined dimensions, the first predetermined dimensions corresponding to external dimensions of a first electrical connector and (2) a partially-sheared punchout section defined in the substantially planar portion of the chassis wall, the punchout section removably coupled to the chassis wall and having an edge contiguous with the first port, the edge forming a portion of a perimeter of the first port and substantially coplanar with the substantially planar portion of the chassis wall, the punchout section selectably removable to create an aperture through the chassis wall, the first port and the aperture cooperating to form a second port through the chassis wall of second predetermined dimensions, the second predetermined dimensions corresponding to external dimensions of a second electrical connector.

Although the present invention and its advantages have been described in detail, those skilled in the art should understand that they can make various changes, substitutions and alterations herein without departing from the spirit and scope of the invention in its broadest form.

What is claimed is:

1. A computer chassis, comprising:

a chassis wall having a substantially planar portion, said substantially planar portion having a first port therethrough of first predetermined dimensions, said first predetermined dimensions corresponding to external dimensions of a first electrical connector; and a partially-sheared punchout section defined in said substantially planar portion of said chassis wall, said punchout section removably coupled to said chassis wall and having an edge contiguous with said first port, said edge forming a portion of a perimeter of said first port and substantially coplanar with said substantially planar portion of said chassis wall, said punchout section selectably removable to create an aperture through said chassis wall, said first port and said aperture cooperating to form a second port through said chassis wall of second predetermined dimensions, said second predetermined dimensions corresponding to external dimensions of a second electrical connector, said punchout section thereby yielding a port selectably configurable to accept electrical connectors of different dimension therethrough.

2. The computer chassis as recited in claim 1 wherein said chassis wall is composed of an electromagnetic interference-shielding material, said punchout section forming a portion of an electromagnetic shield when said first electrical connector is selectably mounted through said first port to thereby isolate electromagnetic fields within said chassis from electromagnetic fields without said chassis.

3. The computer chassis as recited in claim 1 wherein said punchout section is coupled to said chassis wall by a tie-in section, said tie-in section manually shearable to create said aperture and said second port.

4. The computer chassis as recited in claim 1 wherein a plane of said punchout section is noncoplanar with said substantially planar portion of said chassis wall, said punchout section thereby tapered toward a plane of said substantially planar portion to substantially intersect said plane at said edge.

5. The computer chassis as recited in claim 1 wherein said first electrical connector has a substantially planar first mounting flange about an exterior perimeter thereof, a perimeter of said first port, including said edge of said punchout section, being substantially planar to mate with said first mounting flange, said perimeter of said first port and said first mounting flange cooperating to form an electromagnetic shield when said first electrical connector is selectably mounted through said first port to thereby isolate electromagnetic fields within said chassis from electromagnetic fields without said chassis.

6. The computer chassis as recited in claim 1 wherein said punchout section is a partially-sheared section of said substantially planar portion of said chassis wall.

7. The computer chassis as recited in claim 1 wherein said first electrical connector consists of fewer electrical conductors than said second electrical connector.

8. The computer chassis as recited in claim 1 wherein said first electrical connector is selected from the group consisting of:

a small computer systems interface (SCSI) II connector and a DB-9 connector.

9. The computer chassis as recited in claim 1 wherein said second electrical connector is selected from the group consisting of:

a small computer systems interface (SCSI) III connector and a DB-25 connector.

10. The computer chassis as recited in claim 1 wherein said chassis contains electrical components of a personal computer (PC).

11. A method of manufacturing a configurable computer chassis port, comprising the steps of:

forming a first port through a substantially planar portion of a chassis wall, said first port having first predetermined dimensions, said first predetermined dimensions corresponding to external dimensions of a first electrical connector; and defining a partially-sheared punchout section in said substantially planar portion of said chassis wall, said punchout section removably coupled to said chassis wall and having an edge contiguous with said first port, said edge forming a portion of a perimeter of said first port and substantially coplanar with said substantially planar portion of said chassis wall, said punchout section selectably removable to create an aperture through said chassis wall, said first port and said aperture cooperating to form a second port through said chassis wall of second predetermined dimensions, said second predetermined dimensions corresponding to external dimensions of a second electrical connector, said punchout section thereby yielding a port selectably configurable to accept electrical connectors of different dimension therethrough.

12. The method as recited in claim 11, further comprising the step of composing said chassis wall of an electromagnetic interference-shielding material, said punchout section forming a portion of an electromagnetic shield when said first electrical connector is selectably mounted through said first port to thereby isolate electromagnetic fields within said chassis from electromagnetic fields without said chassis.

13. The method as recited in claim 11 wherein said step of defining comprises the step of coupling said punchout section to said chassis wall by a tie-in section, said tie-in section manually shearable to create said aperture and said second port.

14. The method as recited in claim 11 wherein said steps of forming and defining are performed in a single stamping operation and wherein a plane of said punchout section is noncoplanar with said substantially planar portion of said chassis wall, said punchout section thereby tapered toward a plane of said substantially planar portion to substantially intersect said plane at said edge.

15. The method as recited in claim 11, further comprising the step of mounting said first electrical connector in said first port, said first electrical connector having a substantially planar first mounting flange about an exterior perimeter thereof, a perimeter of said first port, including said edge of said punchout section, being substantially planar to mate with said first mounting flange, said perimeter of said first port and said first mounting flange cooperating to form an electromagnetic shield when said first electrical connector is selectably mounted through said first port to thereby isolate electromagnetic fields within said chassis from electromagnetic fields without said chassis.

16. The method as recited in claim 11 wherein said step of defining comprises the step of partially shearing a section of said substantially planar portion of said chassis wall to define said punchout section.

17. The method as recited in claim 11, further comprising the step of providing fewer electrical conductors in said first electrical connector than in said second electrical connector.

18. The method as recited in claim 11, further comprising the step of mounting said first electrical connector in said first port, said first electrical connector selected from the group consisting of:

a small computer systems interface (SCSI) II connector and a DB-9 connector.

19. The method as recited in claim 11, further comprising the step of mounting said second electrical connector in said second port, said second electrical connector selected from the group consisting of:

a small computer systems interface (SCSI) III connector and a DB-25 connector.

20. The method as recited in claim 11, further comprising the step of containing electrical components of a personal computer (PC) in said chassis.

21. A personal computer (PC), comprising:

an external data input device;

an external data output device; and electronic data processing circuitry contained within a main chassis and removably couplable to said external data input and output devices, a wall of said main chassis having a substantially planar portion, said substantially planar portion having a first port therethrough of first predetermined dimensions, said first predetermined dimensions corresponding to external dimensions of a first electrical connector, a partially-sheared punchout section defined in said substantially planar portion of said chassis wall, said punchout section removably coupled to said chassis wall and having an edge contiguous with said first port, said edge forming a portion of a perimeter of said first port and substantially coplanar with said substantially planar portion of said chassis wall, said punchout section selectably removable to create an aperture through said chassis wall, said first port and said aperture cooperating to form a second port through said chassis wall of second predetermined dimensions, said second predetermined dimensions corresponding to external dimensions of a second electrical connector, said punchout section thereby yielding a port selectably configurable to accept electrical connectors of different dimension therethrough to allow said electronic data processing circuitry to be coupled to a one of said external data input and output devices.

22. The PC as recited in claim 21 wherein said chassis wall is composed of an electromagnetic interference-shielding material, said punchout section forming a portion of an electromagnetic shield when said first electrical connector is selectably mounted through said first port to thereby isolate electromagnetic fields within said chassis from electromagnetic fields without said chassis.

23. The PC as recited in claim 21 wherein said punchout section is coupled to said chassis wall by a tie-in section, said tie-in section manually shearable to create said aperture and said second port.

24. The PC as recited in claim 21 wherein a plane of said punchout section is noncoplanar with said substantially planar portion of said chassis wall, said punchout section thereby tapered toward a plane of said substantially planar portion to substantially intersect said plane at said edge.

25. The PC as recited in claim 21 wherein said first electrical connector has a substantially planar first mounting flange about an exterior perimeter thereof, a perimeter of said first port, including said edge of said punchout section, being substantially planar to mate with said first mounting flange, said perimeter of said first port and said first mounting flange cooperating to form an electromagnetic shield when said first electrical connector is selectably mounted through said first port to thereby isolate electromagnetic fields within said chassis from electromagnetic fields without said chassis.

26. The PC as recited in claim 21 wherein said punchout section is a partially-sheared section of said substantially planar portion of said chassis wall.

27. The PC as recited in claim 21 wherein said first electrical connector consists of fewer electrical conductors than said second electrical connector.

28. The PC as recited in claim 21 wherein said first electrical connector is selected from the group consisting of:

a small computer systems interface (SCSI) II connector and a DB-9 connector.

29. The PC as recited in claim 21 wherein said second electrical connector is selected from the group consisting of:

a small computer systems interface (SCSI) III connector and a DB-25 connector.

30. The PC as recited in claim 21 wherein perimeters of said first and second ports contain portions adapted to receive threaded mounting rods therethrough.

* * * * *